Patented Dec. 18, 1945

2,391,330

UNITED STATES PATENT OFFICE 2,391,330

SYNTHETIC RUBBER COMPOSITIONS

Rupert C. Morris, Berkeley, and Edward C. Shokal, Oakland, Calif., assignors to Shell Development Company, San Francisco, Calif., a corporation of Delaware No Drawing. Application February 28, 1944,
Serial No. 524,310

14 Claims. (Cl. 260—36)

This invention relates to synthetic rubber compositions. More particularly, the invention pertains to improved compositions of matter containing a rubber-like polymer of an open-chain conjugated diene and as a tackifier and softener therefor a particular type of unsaturated ether.

As is well known, mastication or milling of crude natural rubber in the presence of oxygen alters its physical properties and mechanical behavior. Such treatment transforms the rubber to a plastic state so that it may be shaped into any form desired. Furthermore, the treatment transforms the rubber to a condition whereby it is tacky and capable of readily taking up sulfur as well as other organic and inorganic substances used in compounding rubber compositions for vulcanization. This tackiness and plasticity which are obtained by mastication in contact with oxygen are of great value in facilitating the processing of natural rubber.

The property known generally as tackiness is of particular importance for compounded rubber and other rubber-like substances. Materials are said to be tacky when they possess the ability for pieces of the material to adhere vigorously together when brought into contact with one another. Many articles of vulcanized rubber, and especially those of somewhat complex form, are manufactured by placing a number of separate pieces of compounded rubber into an appropriate mold and subjecting the material to pressure and heat in order to effect vulcanization. The vulcanization is ordinarily effected by heating the mold with the compounded rubber therein under high pressure. When the compounded rubber has been properly processed by mastication and formulated so that it is tacky, the application of pressure in effect fuses the several pieces in the mold into a single coherent mass. Compounded rubber having tackiness of sufficient degree yields a finished vulcanized rubber article which displays no evidence of having been formed from several separate pieces of the compounded rubber. If tackiness is lacking in the compounded material, satisfactory joining of the several pieces in the mold during processing is not obtained.

Synthetic rubber-like polymers do not respond to the mastication treatment in the same manner as does natural rubber. This difference in behavior is especially marked with rubber-like polymerizates which are copolymers of butadiene and acrylonitrile. Such synthetic rubber-like polymers per se lack tackiness and sufficient plasticity for processing to satisfactory vulcanizates. The lack of tackiness and plasticity is true in general of all butadiene polymerizates including those which are copolymers with other substances.

Among various substances, dibutyl phthalate has been suggested and used as a plasticizer for synthetic rubber by incorporation with the polymers. While the polymers are rendered more plastic by incorporation therein of this material and other substances, compositions with better properties have been desired.

It is an object of the present invention to provide synthetic rubber compositions of improved properties.

Another object is to provide compositions of the desired tackiness and plasticity which contain butadiene polymerizates.

A further object is to provide compositions which have adequate tackiness and plasticity and which contain copolymers of butadiene with other polymerizable compounds.

An additional object is to provide improved vulcanizates of butadiene polymerizates or copolymers of butadiene and other polymerizable compounds.

The synthetic rubber compositions of the invention contain as tackifiers and softeners compounds of the general formula

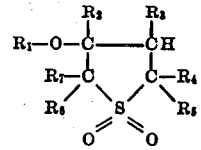

wherein $R_1$ is an unsaturated radical containing an unsaturated aliphatic carbon atom, and $R_2$, $R_3$, $R_4$, $R_5$, $R_6$ and $R_7$ are each a member selected from the group consisting of a hydrogen atom (most preferred), a halogen atom (fluorine, chlorine, bromine or iodine), and a hydrocarbon radical such as methyl, ethyl, propyl, isopropyl, normal butyl, isobutyl, secondary butyl, tertiary butyl, normal pentyl, isopentyl, secondary pentyl, hexyl, normal octyl, iso-octyl, normal decyl, isodecyl, dodecyl, tetradecyl, cetyl, stearyl, trimethyl octodecyl, allyl, methallyl, crotyl, methyl vinyl carbinyl, butenyl, pentenyl, hexenyl, propargyl, geranyl, oleyl, phenyl, naphthyl, anthryl, tolyl, xylyl, secondary butyl-naphthyl, dipropyl-naphthyl, benzyl, naphthyl-butyl, phenethyl, vinyl-phenyl, crotonyl-naphthyl, methallyl-phenyl, triallyl-naphthyl, naphthylallyl, 2-phenyl-ethenyl, phenyl vinyl carbinyl, cinnamyl, acetyl, propionyl, caproyl, stearacyl, benzoyl, cyclopentyl, ethyl-cyclohexyl, tributyl-cyclohexyl, cyclopentenyl, cyclohexenyl, vinyl cyclohexenyl, etc. The excellent and superior tackifying and softening properties of the compound are attributed to the presence, in the unsaturated radical $R_1$, of the unsaturated aliphatic carbon atom. Typical examples of the unsaturated radical containing an unsaturated aliphatic carbon atom, which is represented by $R_1$, are such groups as allyl, crotyl, methyl vinyl carbinyl (butene-1-yl-3 or alpha-methylallyl), butenyl, pentenyl, hexenyl, methallyl (beta-methylallyl), 2-chlorallyl, propargyl, cinnamyl, cyclopentenyl, cyclohexenyl, isopentenyl, 3-chlorallyl, 2-phenylallyl, octenyl, nonenyl, oleyl, phenyl vinyl carbinyl (3-phenyl-propene-1-yl-3 or alpha-phenylallyl), 2-bromocrotyl, 3-cyanoallyl, and the like as well as unsaturated groups of the type

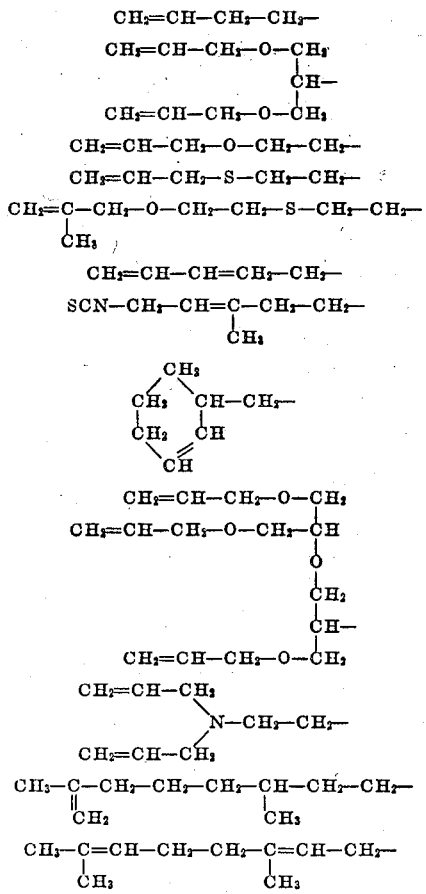

Preferably the unsaturated radical $R_1$ is an alkenyl radical having a saturated carbon atom linked to the oxygen atom of the ether in the compounds. Most preferred are the unsaturated radicals which are allylic alkenyl groups and contain an aliphatic double bond between the two carbon atoms in the beta and gamma positions with respect to the saturated carbon atom linked to the oxygen atom in the ether compound. The allyl group is a most preferred unsaturated radical.

In this specification and the appended claims the radical of the formula

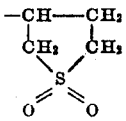

is termed 3-sulfolanyl. Thus, the most preferred tackifier and softener for use in the compositions of the invention is termed allyl-3-sulfolanyl ether and is represented by the structural formula

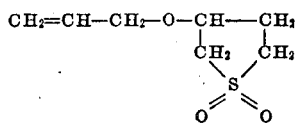

Methods of preparing the unsaturated ethers employed in the compositions are described in our copending application Serial No. 446,130, filed June 6, 1942, of which the present application is a continuation-in-part.

The compositions of the invention contain a rubber-like polymer of an open-chain conjugated diene as principal constituent which is rendered tacky and softened by the unsaturated ether in the composition. The rubber-like constituents of the compositions are polymers or copolymers of open-chain conjugated dienes like butadiene-1,3, isoprene, pentadiene, hexadiene, 2-methylpentadiene-1,3, 2-methylpentadiene-2,4, heptadiene, chloroprene, bromoprene, octadiene, nonadiene, etc., as well as copolymers of one or several of these substances with at least one other compound polymerizable therewith which contains an olefinic linkage such as acrylonitrile, methacrylonitrile, acrolein, methacrolein, methyl vinyl ketone, methyl isopropenyl ketone, methyl methacrylate, ethyl acrylate, styrene, methyl styrene, vinyl chloride, vinyl acetate and the like. An important class of rubber-like constituents consists of copolymers of butadiene-1,3, and acrylonitrile as exemplified by products known to the trade as "Hycar O. R.," "Perbunan," "Perbunan Extra." The percentage of acrylonitrile in the copolymer is ordinarily between about 10% and about 40% by weight of the total, although not necessarily limited to this range. Also important are butadiene-styrene copolymers such as "Buna S," "Buna SS," "GR-S." The tackifiers of this invention are of maximum potency when used with butadiene-acrylonitrile copolymers which are particularly lacking in tackiness. Another important type of rubber-like polymer is that of chloroprene (2-chlorbutadiene-1,3) with isoprene and/or other polymerizable compounds. The rubber-like copolymers of isobutylene or butadiene or isoprene such as "Butyl" rubber or "GR-I," are also given improved properties by corporation therewith of the unsaturated ethers of the invention. While the polymerizates of the compositions can be those obtained with the aid of sodium or boron trifluoride as catalyst, it is preferred to have rubber-like elastomers of the compositions prepared by emulsion polymerization using organic peroxides or inorganic per salts as catalyst. By a "rubber-like" polymer is meant one having the characteristics of natural rubber like elastic recovery, vulcanizability, etc.

The proportion of the unsaturated ethers can vary considerably in the compositions depending to a large extent upon the particular substance contained therein and the use to which the composition is put. Ordinarily 5 to 40 parts of ether per 100 parts of polymer by weight are suitable, although in special cases a greater or lesser proportion is employed. A preferred range is 10 to 30 parts of softener per 100 parts of polymer. In general, the larger the proportion of ether the more tacky and plastic is the composition. Further, the larger the proportion of ether the greater is the flexibility and elongation of the vulcanizate, but the lower is its tensile strength.

The unsaturated ether is incorporated into the polymer in a Banbury mixer or on an open rubber mill. A friction roll mill using tight set cold rolls is suitable. The incorporation is effected with mills maintained at lower temperatures than are ordinarily employed in milling or masticating natural rubber. Temperatures not higher than about 50° C. are to be recommended for the rolls in preparing the compositions. The addition of at least a portion of the tackifier early in the milling operation hastens the breakdown of the rubber, reduces the heat built up and otherwise facilitates the operation by rendering the stock less nervy and more plastic. According to the wishes of the operator and the idiosyncrasies of the particular composition, the addition is made at any time from the commencement to the completion of milling, although it is ordinarily preferred to incorporate the softener and tackifier early in the milling operation. Where compounding on a roll mill is followed by refining in a special refining mill, the addition of all or part of the tackifier may be made in the second operation. If desired, the mastication and compounding is easily accomplished in a Banbury mixer.

While the foregoing description has emphasized the sulfone ether softener and the rubber-like synthetic elastomer in the compositions, the presence therein of various other ingredients is necessary and desirable to enable preparation of a vulcanizable composition. Thus, in preparing a composition for processing or vulcanizing to a finished rubber article, a number of other substances are also incorporated in the composition.

In the case where a polymer or copolymer of butadiene or other open-chain conjugated diene is used in the composition, which is subjected to vulcanization treatment, a number of ingredients are present in addition to the ether softener. Incorporated in the composition is a vulcanizing agent such as sulfur or a sulfur liberating compound which is vital to effecting vulcanization of the polymer. The composition may contain an anti-oxidant or age retarder such as for example, acetaldehyde-aniline reaction product, N,N'-di-o-tolyl-ethylenediamine, p,p'-dimethoxy-diphenylamine, phenyl beta-naphthylamine, phenyl alpha-naphthylamine, N,N'-di-beta-naphthyl-p-phenylenediamine, 2,2,4-trimethyl-1,2-dihydroquinoline, p-nitrosodimethylamine, etc. An organic accelerator is included such as benzothiazyl disulfide, tetramethylthiuram disulfide, dibutylxanthic disulfide, mercaptobenzothiazole, benzothiazyl disulfide, zinc salt of mercaptobenzothiazole, etc., together with an activator for the accelerator such as zinc oxide. An inorganic accelerator such as litharge can be used alone or in conjunction with one or more organic accelerators. Various powdered materials may be employed as fillers and reinforcers in the compositions such as channel blacks, soft blacks, fine size whitings and clays, light calcined magnesia, magnesium carbonate and other fillers which are essentially inert such as barytes, lithopones, etc. Certain other ingredients are also useful in very minor amounts like stearic or lauric acid and waxes, either paraffinic or natural. The incorporation of these various substances may be effected by milling.

In a similar manner, a number of ingredients are usefully incorporated with the compositions of elastomers of a haloprene. As vulcanizing agents, such compositions contain a metallic oxide such as magnesium oxide, zinc oxide or lead oxide which substances also function as stabilizing agents for the unvulcanized compositions. If desired, the composition may contain sulfur as a substituent although it functions primarily as a vulcanization accelerator with haloprene elastomers. Organic vulcanization accelerators are sometimes useful while the incorporation of antioxidants, a number of particular compounds of which were indicated above, impart age and heat resisting qualities to the vulcanizates. Various fillers used in compounding with butadiene polymerizates may be used in compounding with haloprene polymers. Such substances as stearic acid, wood rosin, paraffin wax are also of utility in the compositions.

While the compositions contain the unsaturated ethers as softeners, various other softeners may be incorporated in minor amounts such as dibutyl phthalate, dioctyl phthalate, dicresyl phosphate, triacetine, tetraline, process oils, soft coal tar, cumar resins, soft factice and the like.

The compositions containing the various ingredients are useful as compounded rubber-like materials which may be vulcanized. The vulcanization of the compounded compositions is effected in the usual well-known manner by application of heat and pressure in a mold.

The unvulcanized compositions are subjected to numerous shaping compositions known in the art for fabrication into articles which can be finally corrected and vulcanized. Sheets can be formed by calendery on heated rolls or by casting from solutions. Sheets, tubes, rods and coatings can be formed by continuous or discontinuous extrusion operations. Articles of substantially any shape can be made by operations using open or closed molds. The compositions can be applied to fibrous material, such as fabric, by calendering or by impregnation with a suitable solution. These shaping operations and many others are facilitated by the presence of one or more of the tackifiers of the present invention in the compositions.

Shaped structures of synthetic rubber and structureless material as well are often required to undergo additional fabrication. A paramount illustration of it is the laminating or plying-up of casings and tubing where there are involved the cohesion of the composition to itself and its adhesion to different metal in addition to other factors contributing to workability. Ease of fabrication and the quality of the resulting product are increased markedly by the presence of the tackifiers herein described.

A number of the alkenyl-3-sulfolanyl ethers were used as tackifiers and softeners with a synthetic rubber for the purpose of demonstrating the superiority of the compositions obtained as compared with compositions containing several conventional substances. A copolymer of about 60 parts butadiene and 40 parts of acrylonitrile which is available under the trade name of "Hycar O. R." and is especially lacking in tackiness, was chosen for this purpose. The copolymer was compounded on a rubber mill into a vulcanizable composition according to the formula below, the ingredients being added in the order listed:

| | Parts by weight |
|---|---|
| Hycar O. R. | 100 |
| Phenyl beta-naphthylamine | 1.0 |
| Benzothiazyl disulfide | 1.25 |
| Tackifier and softener | Varied |
| Zinc oxide | 5.0 |
| Channel black | 50.0 |
| Stearic acid | 0.5 |
| Sulfur | 1.25 |

After compounding, the tackiness and plasticity of the compositions were determined on a Scott plastometer. The relative tackiness was measured by determining the load required to give 0.1 inch of permanent deflection in 30 seconds. The "plasticity" is a measure of the plastic properties of the composition and is related to the tackiness. A low value is desirable. The results of the test are tabulated below:

| Tackifier and softener | Parts per 100 parts of Hycar O. R. | Tackiness | Plasticity |
|---|---|---|---|
| None | | Very poor | 33.7 |
| Dibutyl phthalate | 15 | Poor | 29 |
| Dibutyl phthalate | 25 | Fair | 21.5 |
| Soft coal tar | 25 | Slight | 65 |
| Refined coal tar | 25 | Fair | |
| Allyl 3-sulfolanyl ether | 15 | do | 24.5 |
| Allyl 3-sulfolanyl ether | 25 | Good | 15 |
| Methallyl 3-sulfolanyl ether | 25 | do | 16.8 |
| Methyl vinyl carbinyl 3-sulfolanyl ether | 25 | do | |
| Crotyl 3-sulfolanyl ether | 25 | Poor | 8.0 |
| Nonenyl 3-sulfolanyl ether | 25 | Moderately good | 17 |

The excellent or superior tackiness imparted to the compositions by the alkenyl 3-sulfolanyl ethers is evident from the above table. It is seen that 15 parts of allyl 3-sulfolanyl ether is as effective in this manner as 25 parts of the conventional dibutyl phthalate. However, the tackiness imparted to the compositions is not the sole property which is desirable. Since upon curing to vulcanizates it is necessary that various properties of the vulcanizate be improved or at least impaired as little as possible. The ideal tackifier and softener is one which gives good tackiness to the unvulcanized composition while imparting improved properties to the vulcanizate. The alkenyl 3-sulfolanyl ethers approach this ideal by giving a desirable balance of the various properties for both the unvulcanized and vulcanized compositions.

This is evident from the properties tabulated below for vulcanizates of compositions compounded as described above. The compositions were cured for 30 minutes at 153° C.

with the results given for tackiness and plasticity in the preceding table, show the excellence and superiority of the synthetic rubber compositions which contain the alkenyl 3-sulfolanyl ethers in comparison with conventional tackifiers and softeners.

In the above table the ultimate elongation indicates the extent to which the vulcanizate is stretched at breaking and as high a value as possible is desired without too great a sacrifice in tensile strength. The modulus at 300% elongation is the load which is required to stretch the specimen 300% and the resistant value for a given weight or proportion of softener indicates the best softener. The durometer hardness is a property which must not be sacrificed to attain improvement of other properties of the composition; a value of from about 40 to 60 being desired. The abrasion resistance is a measure of the wearing quantities of the vulcanizate and the smaller value demonstrates a superior property in this respect. The rebound is a measure of elastic properties of the vulcanizate and is preferably as high as possible. Since synthetic rubber vulcanizates are subjected to low temperatures in practical uses thereof, at times it is desirable that they remain flexible at low temperature. The stiffening temperature indicates this property of the vulcanizate; with low values being desired.

A rubber-like polymer of chloroprene (2-chlorobutadiene-1,3) with at least one other polymerizable compound containing an olefinic linkage and which is known as "Neoprene ILS," was softened and the vulcanizate rendered more freeze resistant by incorporation therein of allyl 3-sulfolanyl. Another proportion of the polymer had conventional dibutyl phthalate incorporated therein for comparison.

The polymer was compounded according to

| Tackifier and softener | Parts per 100 parts of Hycar O. R. | Tensile strength, lbs./in.² | Ultimate elongation, percent | 300% modulus, lbs./in.² | Durometer hardness, Shore | Abrasion resistance, cc./H. P. hr. | Rebound in percent of fall | Stiffening temperature, °C. |
|---|---|---|---|---|---|---|---|---|
| None | | 4,308 | 494 | 2,260 | 71 | 35 | | +1 |
| Dibutyl phthalate | 15 | 3,530 | 514 | 1,620 | 62 | 16 | 17.7 | |
| Dibutyl phthalate | 25 | 2,866 | 560 | 1,070 | 53 | 71 | 25.0 | −14 |
| Soft coal tar | 25 | 3,324 | 675 | 750 | 66 | 85.5 | | 0 |
| Refined coal tar | 25 | 3,490 | 619 | 970 | 66 | 74 | 7.0 | 0 |
| Allyl 3-sulfolanyl ether | 15 | 2,676 | 621 | 930 | 58 | 24 | 14.7 | −14 |
| Allyl 3-sulfolanyl ether | 25 | 1,824 | 635 | 540 | 47 | 110 | | −18 |
| Methallyl 3-sulfolanyl ether | 25 | 2,560 | 600 | 890 | 52 | 98 | 21.8 | −13 |
| Methyl vinyl carbinyl 3-sulfolanyl ether | 25 | 3,480 | 575 | 1,150 | 55 | 32 | 19 | −20 |
| Crotyl 3-sulfolanyl ether | 25 | 2,904 | 588 | 1,080 | 51 | 90 | 22 | −22 |
| Nonenyl 3-sulfolanyl ether | 25 | 2,900 | 565 | 1,100 | 55 | 65 | 18.2 | −13 |

The values for the vulcanizates in the above table were obtained according to standard A. S. T. M. procedures with the exception of the durometer hardness, rebound and stiffening temperatures. The hardness was measured with a Shore durometer, type A. The rebound was obtained by determining the percentage distance of rebound of a free-falling ⅜ inch steel ball striking a specimen of the vulcanizate. The stiffening temperature is the temperature at which a bent specimen fails to resume its original shape in five seconds, the specimen being immersed in an alcohol bath to attain the temperature.

The values in the above table, when coupled the following formula in which the ingredients are added in the order listed:

|  | Parts by weight |
|---|---|
| Neoprene ILS | 100 |
| Stearic acid | 0.5 |
| Phenyl alpha-naphthylamine | 2.0 |
| Magnesia | 10 |
| Softener | 20 |
| Semi reinforcing carbon black | 100 |
| Zinc oxide | 10 |
| Di-o-tolyl guanidine salt of dicatechol borate | 1 |

The compounded synthetic rubber compositions were cured for 30 minutes at 153° C. and physical properties determined with the results given in the table below:

| Softener | Allyl 3-sulfolanyl ether | Dibutyl phthalate |
| --- | --- | --- |
| Tensile strength, lbs./in.$^2$ | 1,955 | 2,264 |
| Ultimate elongation, percent | 231 | 202 |
| Durometer hardness, Shore | 77 | 77 |
| Abrasion resistance, cc./H. P. hr | 94 | 190 |
| Rebound, percent of fall | 15 | 14 |
| Stiffening temperature, °C | −5 | −5 |

The superior elasticity of the vulcanizate containing the allyl 3-sulfolanyl ether is evident from the higher values obtained for ultimate elongation in the above table. Furthermore, the wearing qualities of the compositions were decidedly better than that containing dibutyl phthalate.

We claim as our invention:

1. A composition of matter containing a rubber-like polymer of a conjugated aliphatic diolefin, and as a softening agent therefor, an ether of a cyclic sulfone, in which ether the sulfur atom of the sulfone group is a member of a five-membered heterocyclic ring wherein the other four members are saturated carbon atoms, and in which ether one bond of the ethereal oxygen atom is attached to the carbon atom in the heterocyclic ring which is once removed from the sulfur atom while the other bond of the ethereal oxygen atom is attached to an unsaturated radical containing an unsaturated aliphatic carbon atom.

2. A composition of matter comprising a vulcanizate of the composition as claimed in claim 1.

3. A composition of matter containing a rubber-like copolymer from a conjugated aliphatic diolefin, and another compound polymerizable therewith which contains a terminal olefinic linkage, and as a softening agent therefor an alkenyl 3-sulfolanyl ether.

4. A composition of matter comprising a vulcanizate of the composition as claimed in claim 3.

5. A composition of matter containing a rubber-like copolymer from a conjugated aliphatic diolefin, and another compound polymerizable therewith which contains a terminal olefinic linkage, and as softening agent therefor an alken-2-yl-1 3-sulfolanyl ether.

6. A composition of matter comprising a vulcanizate of the composition as claimed in claim 5.

7. A composition of matter containing a rubber-like copolymer from a conjugated aliphatic diolefin, and another compound polymerizable therewith which contains a terminal olefinic linkage, and as softening agent therefor an allyl 3-sulfolanyl ether.

8. A composition of matter comprising a vulcanizate of the composition as claimed in claim 7.

9. A composition of matter consisting of a rubber-like copolymer of butadiene-1,3 with styrene, and as a softener therefor allyl 3-sulfolanyl ether.

10. A composition of matter comprising a vulcanizate of the composition as claimed in claim 9.

11. A composition of matter consisting of a rubber-like copolymer of butadiene-1,3 with acrylonitrile, and as a softening agent therefor allyl 3-sulfolanyl ether.

12. A composition of matter comprising a vulcanizate of the composition as claimed in claim 11.

13. A composition of matter consisting of a rubber-like copolymer of butadiene-1,3 with acrylonitrile, and as a softening agent therefor methallyl 3-sulfolanyl ether.

14. A composition of matter comprising a vulcanizate of the composition as claimed in claim 13.

RUPERT C. MORRIS.
EDWARD C. SHOKAL.